US005126752A

United States Patent [19]

Weinberg

[11] Patent Number: 5,126,752

[45] Date of Patent: Jun. 30, 1992

[54] INK JET PRINTER HEAD FLUSHING SYSTEM

[75] Inventor: Hillar Weinberg, Cambridge, United Kingdom

[73] Assignee: Linx Printing Technologies Limited, England

[21] Appl. No.: 591,286

[22] Filed: Oct. 1, 1990

[30] Foreign Application Priority Data

Oct. 11, 1989 [GB] United Kingdom ................. 8922873

[51] Int. Cl.[5] .............................................. G01D 15/18

[52] U.S. Cl. ................................ 346/1.1; 346/140 R; 346/75

[58] Field of Search ........................ 346/1.1, 75, 140 R

[56] References Cited

U.S. PATENT DOCUMENTS 4,296,418 10/1981 Yamazaki .............................. 346/75
4,577,203 3/1986 Kawamura ..................... 346/140 R
4,862,192 8/1989 Slomianny ........................... 346/75
4,910,529 3/1990 Regnault .............................. 346/75

FOREIGN PATENT DOCUMENTS 0172995 5/1985 European Pat. Off. .
0277453 8/1987 European Pat. Off. .
00289743 3/1988 European Pat. Off. .
3607237 9/1986 Fed. Rep. of Germany .

*Primary Examiner*—Benjamin R. Fuller
*Assistant Examiner*—Gerald E. Preston
*Attorney, Agent, or Firm*—Lerner, David, Littenberg, Krumholz & Montlik

[57] ABSTRACT

To flush ink out of the ink gun 15 of an ink jet printer, it is connected to a suction source 23 (normally used for gutter suction) through a purge line 33, purge valve 35 and gutter valve 27, while the ink feed line 13 is connected to the solvent reservoir 17 through a feed valve 11 and a flush valve 37. This draws solvent from the solvent reservoir 29 into the feed line 13 and the ink gun 15. Then, the purge line 33 is isolated from the suction device 23, and the feed valve 11 connects the feed line 13 to a supply of ink pressurized by ink pump 5. The pressurized ink is driven into the feed line 13, driving some of the solvent already in the feed line and the ink gun 15 out through the nozzle of the ink gun 15. The ink flow is then stopped before fresh ink reaches the ink gun 15. This avoids ink drying in the ink gun 15, blocking the nozzle, while the jet is not running.

By delivering solvent along the ink feed line 13, and using the suction device 23 and the ink pump 5 to drive the solvent, instead of providing a solvent pump and a solvent line, the complexity, bulk and heat generation of the ink system are minimized.

18 Claims, 4 Drawing Sheets

FIG. 2

VALVE PATTERNS

| VALVE PATTERN NO. | NAME | STATE OF FEED VALVE | STATE OF PURGE VALVE | STATE OF GUTTER VALVE | STATE OF TOP-UP VALVE | STATE OF FLUSH VALVE |
|---|---|---|---|---|---|---|
| 0 | STAND-BY | TO FLUSH VALVE | TO GUTTER VALVE | TO GUTTER | CLOSED | CLOSED |
| 1 | RUN | TO INK SUPPLY | TO GUTTER VALVE | TO GUTTER | CLOSED | CLOSED |
| 2 | PURGE | TO INK SUPPLY | TO RESERVOIR | TO GUTTER | CLOSED | CLOSED |
| 3 | NOZZLE SUCTION | TO FLUSH VALVE | TO GUTTER VALVE | TO PURGE VALVE | CLOSED | CLOSED |
| 4 | TOP-UP | TO INK SUPPLY | TO GUTTER VALVE | TO GUTTER | OPEN | CLOSED |
| 5 | FLUSH | TO FLUSH VALVE | TO GUTTER VALVE | TO PURGE VALVE | CLOSED | OPEN |

STANDBY

RUN

FLUSH

INK JET PRINTER HEAD FLUSHING SYSTEM

The present invention relates to the flushing of the print head of an ink jet printer.

In a typical ink jet printer, an ink system supplies ink to a printing head, and the ink is ejected from a nozzle (or in some devices from one or more of a plurality of nozzles), to be deposited on a substrate onto which the printer prints.

If an ink jet printer is not used for a long period, there is tendency for ink in the print head, especially ink close to the nozzle or nozzles, to dry out. This dried ink can then obstruct or interfere with the flow of ink through the print head and out of the nozzle when the printer is re-started. It is known to use various procedures to clean the print head when a printer is started up, and this may include delivering ink to the print head at maximum pressure in order to clear any obstructions to the nozzle or nozzles.

The maintenance of unobstructed ink flow passages is improved if the print head, and especially the nozzle, can be flushed with a flushing fluid other than ink.

It is particularly beneficial to perform such flushing at the time when the printer is closed down, and the ink has not begun to dry, as the flushing fluid may then be used to remove ink from the vicinity of the nozzle or nozzles, thereby avoiding or reducing the problem of ink drying in the first place. However, the addition of a flushing system to an ink jet printer will typically complicate the ink supply system considerably, as it will normally be necessary to provide a line to convey the flushing fluid to the print head, and also a pump to drive the flushing fluid along the line to the print head. This added complexity can increase the cost, bulk and heat production of the ink system undesirably.

According to the present invention there is provided a method of flushing the print head of an ink jet printer, in which a low pressure source draws flushing fluid into an ink feed line, for delivery to the print head for flushing it, which ink feed line is normally used to deliver ink to the print head. Preferably, the ink delivery system of the printer is then used to expel at least some of the flushing fluid through the or a nozzle of the print head.

Preferably, the vacuum source is applied to a part of the ink path within the print head, and in this case it becomes possible to use the vacuum source to draw flushing fluid through the ink feed line into the print head to flush at least a part of the ink path through the print head before the ink feed system is used to drive flushing fluid through the nozzle.

In many cases, it will be convenient to use as the flushing fluid, the solvent used to dilute the ink.

Where the ink jet printer is of the type which expels ink through a nozzle even when it is not desired to print, and directs ink at such times to a gutter from which the ink is removed by suction, the suction source used to suck ink from the gutter can be used also to suck the flushing fluid into the ink feed line. By using this component for both purposes, the ink system can be simplified further.

The present invention also provides apparatus operating according to the method described above.

Ink jet printing apparatus according to the present invention may comprise means to supply ink under pressure to a first valve, an ink feed line to convey ink from the first valve to a print head from which ink may be expelled through a nozzle, means to supply flushing fluid to the first valve and means to apply suction to a point in the feed line remote from the first valve. the apparatus being operable to apply suction to the said point in the feed line while the first valve permits flushing fluid to pass through it into the ink feed line, and then to permit ink to flow under pressure through the first valve into the ink feed line so as to drive at least some of the flushing fluid out through a nozzle of the print head.

Preferably the suction is applied to a point in the ink path through the print head, so as to be applied in turn to the end of the ink feed line remote from the first valve.

Preferably, the apparatus further comprises a second valve, which is placed either between the first valve and the source of flushing fluid, between the first valve and the source of ink, or in the ink feed line between the first valve and the print head, and which can be used, possibly in conjunction with the first valve, to shut the print head off from both the source of flushing fluid and the source of ink. Preferably, the second valve is provided between the first valve and the source of flushing fluid, as this minimises the number of valves the ink has to flow through to reach the print head during normal operation.

An embodiment of the present invention, given by way of example, will now be described with reference to the accompanying drawings, in which:

FIG. 2 shows in tabular form the states of the valves in each valve pattern adopted in the ink system of FIG. 1;

Figure 1:
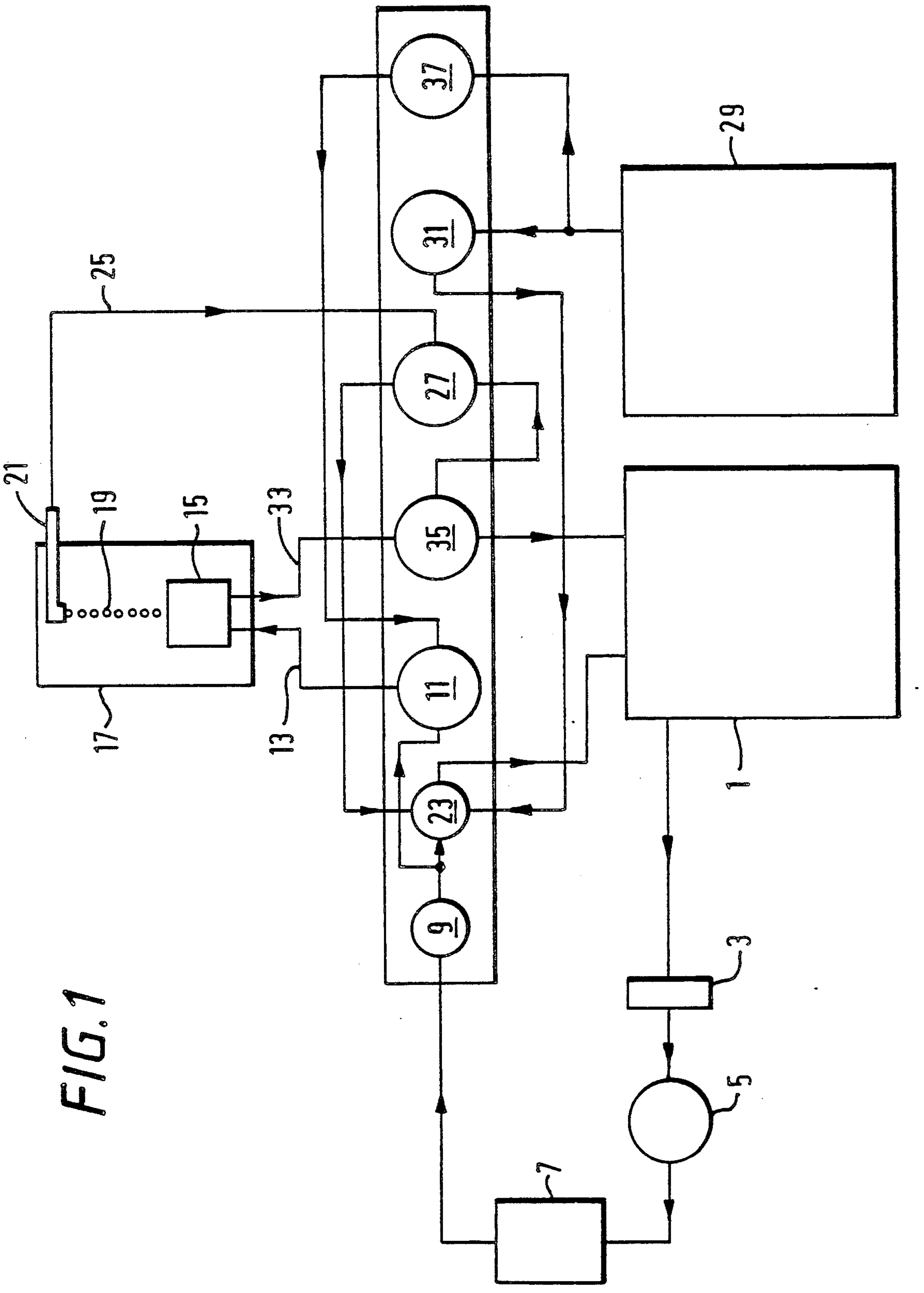
FIG. 1 illustrates schematically the ink system of an ink jet printer embodying the present invention.

FIG. 1 illustrates schematically the ink system of an ink jet printer, of the type which provides a substantially continuous stream of ink drops, some of which are directed onto a substrate to print thereon, the remaining drops being directed to a gutter. The ink jet printer of FIG. 1 is a modification of the ink jet printer of U.S. Pat. application Ser. No. 07/469,496 filed Apr. 16, 1990 by Keeling et al., based on Patent Cooperation Treaty application No. PCT/GB88/00927 filed Oct. 28, 1988 and published under No. PCT/WO 89/03768, assigned to the assignee of the present application and FIG. 1 of the present application is a modification of FIG. 6 of U.S. Pat. application Ser. No. 07/469,496.

FIG. 2 shows the states of the valves in the ink system for each valve pattern used.

Figure 4:
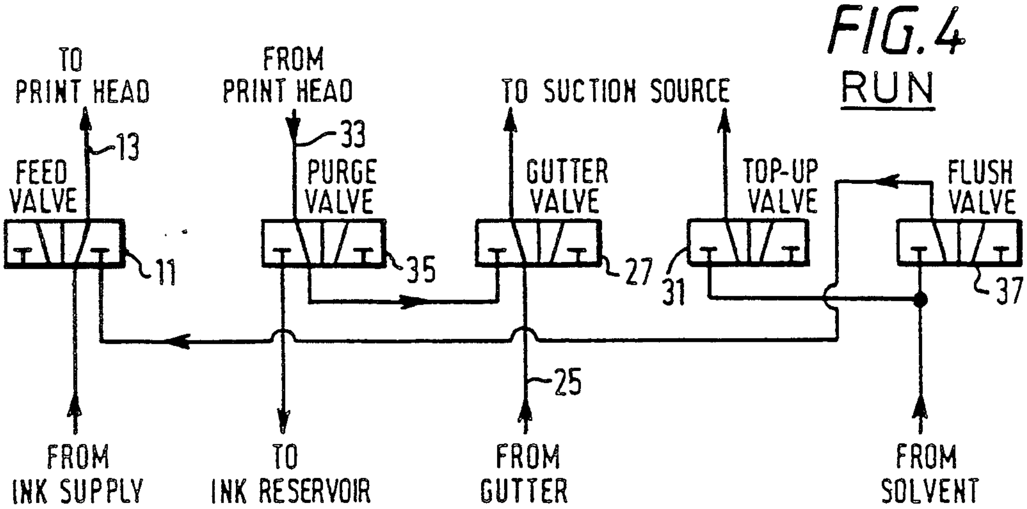
FIG. 4 shows the connections through the valves in the "run" pattern.

In normal operation of the printer of FIG. 1, while the jet is running, the valves are in pattern 1 "run", and the connections between lines through the valves are as shown in FIG. 4. In this state, ink from an ink reservoir 1 passes through a pre-filter 3 to a pump 5. From the pump 5 the ink passes through a main filter 7 and a pressure transducer 9 to a feed valve 11. The pressure transducer 9 senses the pressure of the ink supplied to it, and its output is used in a feedback circuit to control the operation of the pump 5, to maintain the ink at a desired pressure.

From the feed valve 11, the ink passes along a feed line 13 to an ink gun 15 in a print head 17. The ink is ejected through a nozzle of the ink gun 15, to form a stream of ink drops 19. Some of the ink drops 19 will be deflected to print on a substrate, and the remaining ink drops will pass to a gutter 21.

The ink from the pressure transducer 9 also flows through a suction device 23, and back to the ink reservoir 1. The flow of ink through the suction device 23 is used to create suction pressure at the inputs shown at the top and bottom of the suction device 23 in FIG. 1. The suction device may be as described in the above-mentioned PCT application, and illustrated in FIG. 7 thereof.

The gutter 21 is connected to a gutter line 25, which leads to a gutter valve 27. The gutter valve 27 connects the gutter line 25 to a suction input of the suction device 23. Accordingly, ink entering the gutter 21 is sucked through the gutter line 25 and the gutter valve 27 into the suction device 23. It then joins the ink flowing through the suction device from the pressure transducer 9, and is returned to the ink reservoir 1.

In order to control the viscosity of the ink, solvent from a solvent reservoir 29 can be added to the ink reservoir 1, to dilute the ink therein. This is done by opening a solvent top-up valve 31, which connects the solvent reservoir 29 with a suction input of the suction device 23. This places the valves in pattern 4, "top-up". Solvent is then sucked into the suction device 23 and joins the ink returning to the ink reservoir 1.

A purge line 33 connects the ink gun 15 with the ink reservoir 1 through a purge valve 35. In valve pattern 2 "purge", the purge valve 35 is opened to permit ink to flow through the feed valve 11 along the feed line 13, through the ink gun 15, along the purge line 33, through the purge valve 35 and into the ink reservoir 1. This may be done to purge the ink gun 15 and the feed line 13 of any air before the stream of ink drops 19 is started during a start-up procedure for the printer. Additionally, in valve pattern 3 "nozzle suction" the purge valve 35 connects the purge line 33 to the gutter valve 27, and the gutter valve 27 connects the purge valve 35 to the suction device 23, in order to apply suction to the ink gun 15. This nozzle suction mode can be used to provide a quick and clean turn-off of the stream of ink drops 19 during a shut-down operation.

The above operations of the ink supply system of FIG. 1 are in accordance with the description of the above-mentioned PCT application, and are described in greater detail therein.

In order to permit the ink gun 15 to be flushed with solvent, for cleaning, a flush valve 37 is provided. The flushing operation has two stages.

Figure 5:
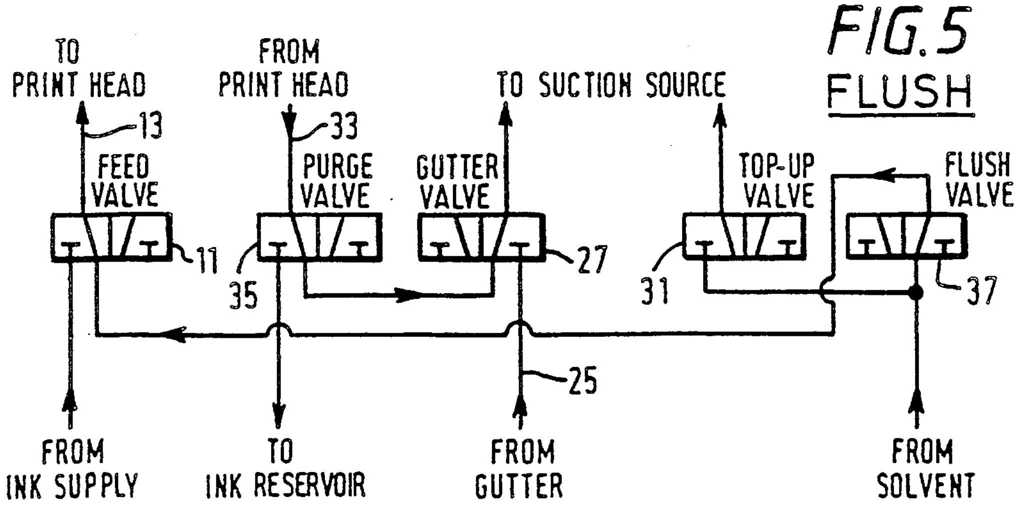
FIG. 5 shows the connections through the valves in the "flush" pattern.

In the first stage, the valves are put in pattern 5 "flush". The connections through the valves in this state are shown in FIG. 5. In this valve pattern, the flush valve 37 is opened, and the feed valve 11 is switched to pass solvent from the flush valve 37 into the feed line 13. The gutter valve 27 and the purge valve 35 are placed in the same positions as for the "nozzle suction" valve pattern, so that suction pressure from the suction device 23 is applied through the gutter valve 27 and the purge valve 35 to the purge line 33. Since the nozzle aperture of the ink gun 15 is very small, the suction pressure is applied through the ink gun 15 to the feed line 13, and in this way solvent is sucked from the solvent reservoir 29 through the flush valve 37 and the feed valve 11 into the feed line 13. Preferably, this stage is held for long enough to permit solvent to travel the length of the feed line 13, and pass through the ink gun 15 into the purge line 33, flushing at least a part of the internal ink passages of the ink gun 15.

In the second stage of the flushing operation, the valves are placed in the normal "run" pattern (FIG. 4), in which both the purge line 33 and the supply of solvent from the solvent reservoir 29 are shut off, and ink is applied under pressure from the pump 5 through the feed valve 11 to the feed line 13 while suction pressure is applied from the suction device 23 through the gutter valve 27 to the gutter 21. During this stage of the flushing operation, ink is driven into the feed line 13, forcing the solvent in the feed line 13 out through the nozzle of the ink gun 15, so as to flush the nozzle.

In this way, the only additional components required to provide the print head flushing operation are the flush valve 37 and the lines connecting this valve to the solvent reservoir 29 and the feed valve 11. The use of the suction device 23 and the ink pressurising pump 5 to drive the solvent along the feed line 13 and out through the nozzle of the ink gun 15 avoids the need to provide a separate pump to drive the solvent. This reduces the complexity, size and heat generation of the ink system. Additionally, by supplying the flushing solvent to the ink gun 15 along the feed line 13, and removing it along the purge line 33 or the gutter line 25, the need to provide one or more solvent lines to the print head 17 is avoided.

The flushing operation is normally performed as part of the shut-down operation of the printer, so as to remove ink from the ink gun 15, and in particular from the nozzle, so as to minimise the risk that the ink gun 15 will be blocked or obstructed when the printer is re-started by ink which has dried at the nozzle while the printer was shut down. For this purpose, it is important that the second stage of the flushing operation is stopped while there is still some solvent remaining in the feed line 13, and the ink from the feed valve 11 which is driving the solvent out through the nozzle of the ink gun 15 has not yet reached the ink gun 15.

It is preferable that the second stage of the flushing operation is continued for long enough to deliver a substantial quantity of solvent from the nozzle of the ink gun 15 to the gutter 21, so as to provide at least partial flushing of the gutter 21 and the gutter line 25. However, this is less important as the gutter 21 and the gutter line 25 are normally sucked clear of ink during the shut-down process, so that they are less likely to be blocked or obstructed by dried ink.

Figure 3:
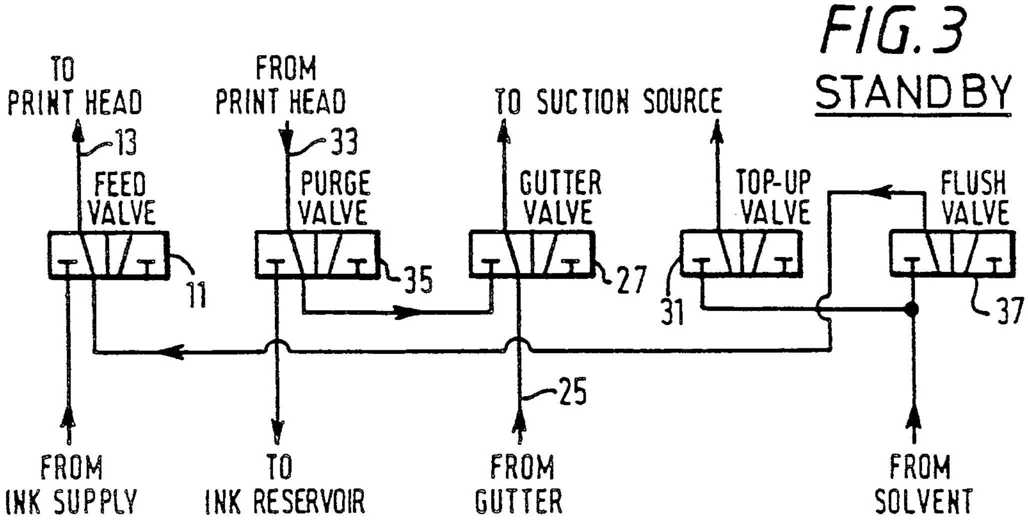
FIG. 3 shows the connections through the valves in the "standby" pattern.

When the jet of the printer has been shut down, the valves are put in pattern 0 "standby", in which the feed line 13 is again connected to the flush valve 37, but this valve is closed, effectively closing the end of the feed line 13. The connections through the valves in this position are shown in FIG. 3.

Preferably, the valves adopt the "standby" pattern when they are all unenergised.

A jet shut-down operation including flushing, for an ink jet printer as described in PCT/WO 89/03768 having an ink system modified as illustrated in FIG. 1 of the present application and fitted with a midi print head, will now be described in detail. Variations to accommodate the micro and macro print heads will be mentioned in passing.

1. The valves are initially in pattern 1 "run", as shown in FIG. 4. To initiate the shut-down operation, the desired ink pressure is raised to maximum, and the pump 5 is controlled accordingly. This maximises the flow of ink through the suction device 23, and thereby maximises the suction provided by the suction device 23. This state is maintained for five seconds, to permit the ink pressure and the suction pressure to stabilise. For the macro print head, a pressure below maximum is used, to avoid jet instability which may arise because of the larger size nozzle.
2. Then the feed valve 11 is switched so as to connect the feed line 13 to the flush valve 37, shutting off the supply of ink to the ink gun 15. At the same time, the gutter valve 27 is switched to connect suction pressure from the suction device 23 to the purge valve 35, applying suction pressure to the ink gun 15 along the purge line 33. Thus, the valves are placed in pattern 3 "nozzle suction" and the stream of ink drops 19 is stopped abruptly. This state is held for one second. For the macro print head, the ink pressure is then raised to maximum. The ink pressure is held at maximum for all print heads for a further five seconds.
3. Next, the flush valve 37 is opened, changing the valve pattern to pattern 5 "flush", as shown in FIG. 5. The feed line 13 is now connected to the solvent reservoir 29 through the flush valve 37, while suction pressure is maintained on the purge line 33. Therefore, solvent is sucked from the solvent reservoir 29 into the feed line 13. This state is maintained for thirty seconds, so as to permit the solvent to travel along the feed line and flush the internal ink cavity of the gun 15. For the micro print head, this state lasts only twenty-five seconds, as the smaller nozzle orifice allows more effective suction of the solvent.
4. The flush valve 37 is then closed, and the gutter valve 27 is switched to remove the suction pressure from the purge valve 35 and apply it again to the gutter line 25. The valves are now in pattern 0 "standby", as shown in FIG. 3. The feed line 13 is closed and the flow of solvent into it stops. At the same time, the desired ink pressure is reduced in preparation for the stage of driving solvent out through the nozzle of the ink gun 15. Since the solvent has a lower viscosity than the ink, the pressure may be reduced at this stage to below the normal running pressure for the ink jet. This state is maintained for five seconds. Both the ink pressure in this step and the normal running pressure are lower for the macro print head, in view of its larger nozzle size.
5. Next, the feed valve 11 is switched to connect the feed line 13 to the pressurised ink from the pressure transducer 9. This returns the valves to pattern 1 "run", as illustrated in FIG. 4. Pressurised ink flows into the feed line 13, driving solvent from the feed line into the ink gun 15 and out through the nozzle. The solvent is forced out through the nozzle because the purge line 33 is closed at the gutter valve 27, to which it is connected through the purge valve 35, as can be seen in FIG. 4. This state is maintained for four seconds. As the ink enters and flows along the feed line 13, there is some mixing at the interface between the ink and the solvent, but even taking this into account the four second period is sufficiently short that no ink reaches the ink gun 15. For the micro print head, the period is five seconds and for the macro print head it is three seconds. The variation is because the volume flow rate of ink (or solvent) through the nozzle varies with print head size.
6. The feed valve 11 is then switched to connect the feed line 13 to the flush valve 37, effectively closing the feed line 13, and the gutter valve 27 is switched to connect the suction source 23 to the purge valve 35, and through it to the purge line 33. This places the valves in pattern 3 "nozzle suction", and abruptly stops the solvent jet through the nozzle of the ink gun 15. This state is maintained for one second.
7. The gutter valve 27 is switched to reconnect the suction device 23 to the gutter line 25, bringing the valve pattern to pattern 0 "standby", as illustrated in FIG. 3. The ink pressure is then raised to maximum, to increase the suction pressure provided by the suction device 23, and this state is maintained for thirty seconds to suck the gutter 21 and gutter line 25 clear of ink and solvent.
8. The desired ink pressure is then set to zero, and five seconds is allowed for the ink pressure to fall. Then, the shut-down sequence is complete.

The print head flushing operation has the effect of transferring solvent from the solvent reservoir 29 into the active part of the ink system. When the ink jet is restarted, the solvent will pass into the ink reservoir 1, thus diluting the ink. If the print head flushing operation is carried out too frequently, solvent will be added to the ink too quickly, and the ink viscosity will fall below the correct level.

One way of preventing this from happening is for the printer automatically to perform the ink jet shut-down sequence described above, including flushing the print head with solvent, only if the ink jet has been running at least for a minimum period, e.g. four hours, when it is shut down. If the ink jet has been running for less time than this when it is shut down, the shut-down sequence will not include flushing the print head with solvent.

Preferably, it is possible for the operator to instruct that the print head 15 will be flushed with solvent during a shut-down sequence, even if the jet has not been running for the minimum period, so that if the operator knows that the printer will be left for a long time after shut-down, he can ensure that the ink gun 15 is flushed clean of ink.

An alternative way of avoiding excessive dilution of the ink is for the printer to perform a series of checks when it is shut down, and decide whether to include flushing the print head in accordance with the results of the checks. Preferably, the following checks are performed:

(a) Has the ink jet been running for a certain minimum time (e.g 45 minutes) to allow the ink system to stabilise?

(b) Is the ink reservoir level above a certain minimum value? As a precaution, the printer will refuse to start up if the ink is low, until the ink reservoir has been topped up. If the reservoir is low at shut-down, the solvent added to the ink system by flushing may raise the level in the ink reservoir to above the minimum level so that the printer will later re-start without requiring a top-up of ink which is in fact necessary. To prevent this, the printer will not flush the print head on shut-down if the ink level is low;

(c) Is the ink pressure greater than the normal minimum running pressure; and (d) Is the jet time of flight greater than a minimum level (e.g 1.5% below its normal correct level)? The printer normally varies the ink pressure with changes in ink viscosity to maintain the jet time of flight (inverse of velocity) constant. If either the jet time of flight or the jet pressure is too low, the ink viscosity is too low, indicating that it is already over-dilute with solvent and no further solvent should be added by flushing the print head.

Only if all four of conditions (a) to (d) are met will the printer automatically flush the print head during shut-down.

By using the conditions (a) to (d) above, the decision of whether to flush or not at shut-down is rendered more flexible in the face of varying conditions, and in particular enables the printer to act appropriately with a variety of inks containing different solvents which may evaporate at different rates. Variations in the effect of temperature can also be accommodated.

Flushing the print head during shut-down tends to leave solvent in the head and in part of the feed line. On re-starting the printer, this solvent will form the jet for an initial short period. If the jet is formed at normal pressure, the low viscosity of the solvent may result in an unstable jet, and it may scatter and cease to enter the gutter, causing a mess in the print head or on whatever the print head aims at. To avoid this, a special start-up routine may be used in which the jet is initially started at a lower pressure, suitable for a jet of solvent, and the pressure raised to the normal running pressure after a short period (three to five seconds) which allows all the unmixed solvent to pass out through the print head nozzle.

Figure 6:
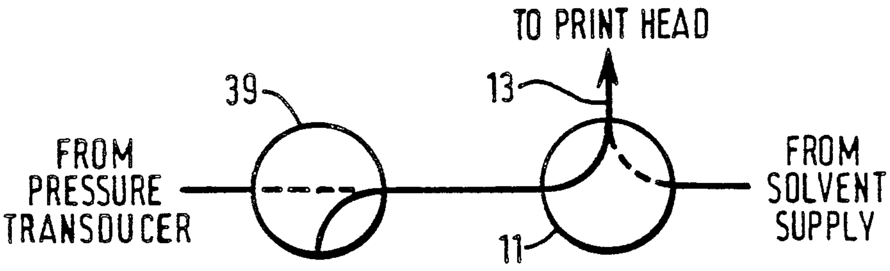
FIG. 6 shows part of a first alternative valve configuration.
Figure 7:
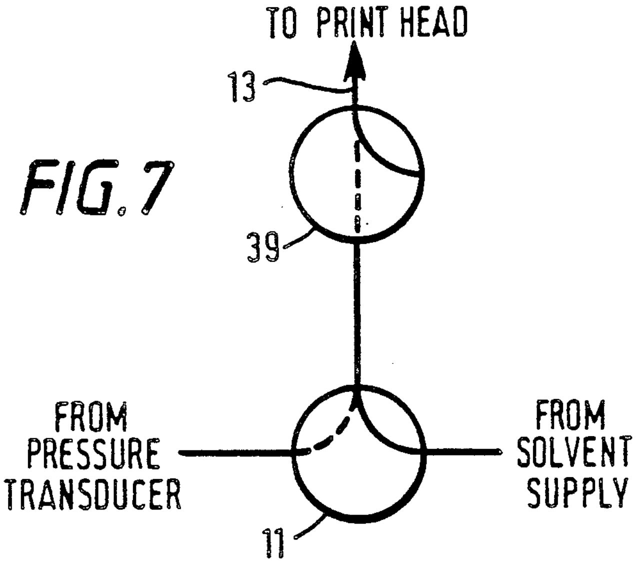
FIG. 7 shows part of a second alternative valve configuration.

An important function of the flush valve 37 is to close the feed line 13 in valve patterns 0 "standby" and 3 "nozzle suction". It would be possible to enable the feed line 13 to be connected selectively to the pressurised ink flowing from the pressure transducer 9 or to the solvent reservoir 29, or to be closed off, by an alternative valve arrangement. For example, the feed valve 11 and the flush valve 37 could be combined in a single three-position valve. Alternatively, the feed valve 11 could be connected to a stop valve 39 positioned as shown in FIG. 6 or positioned as shown in FIG. 7, and the flush valve 37 omitted. In FIGS. 6 and 7, the solid lines through the valves show the connections between the lines when the feed line 13 is shut off, and the broken lines through the valves show the connections made between the lines in the alternative positions of the valves.

Various modifications and alternatives to the illustrated embodiment will be apparent to those skilled in the art. For example, the solvent could be sucked into the ink gun 15, but not driven out through the nozzle. In this case, the nozzle is preferably cleared by the application of nozzle suction before or after the solvent is used to flush the ink gun 15. This will typically be less effective at preventing nozzle blockage by dried ink than driving solvent out through the nozzle, but should nevertheless provide some benefit, especially in printers where the nozzle opens directly into the ink gun cavity, without a nozzle tube.

I claim:

1. A method of flushing a print head of an ink jet printer, said printer comprising a print head and an ink feed line which normally conveys ink to said print head, which method comprises the steps of (i) connecting said ink feed line to a source of flushing fluid, (ii) applying suction pressure to said ink feed line, whereby said flushing fluid from said source enters said ink feed line under the influence of said suction pressure, and (iii) conveying said flushing fluid between said print head and said ink feed line to flush said print head.

2. A method according to claim 1, in which said step (iii) of conveying comprises supplying pressurised ink to said ink feed line following said entry of the flushing fluid into said ink feed line so as to drive at least some of the flushing fluid from said ink feed line through a part of said print head.

3. A method according to claim 2, in which said printer further comprises a supply of pressurised ink and a valve between said supply of pressurised ink and said ink feed line, said valve separating said supply of pressurised ink from said ink feed line during said step (ii) of applying the suction pressure, and said valve connecting said supply of pressurised ink to said ink feed line during said step (iii) of supplying said pressurised ink.

4. A method according to claim 2, in which said flushing fluid is driven through an ink-jet-forming orifice of said print head in said step of supplying pressurised ink.

5. A method according to claim 1, in which said suction pressure is applied to said print head, and through it to the end of said ink feed line proximate to said print head.

6. A method according to claim 3, in which said suction pressure is applied to said print head, and through it to the end of said ink feed line remote from said valve.

7. A method according to claim 5, in which said step (iii) of conveying comprises continuing to apply said suction pressure to said ink feed line and continuing to connect said ink feed line to a source of flushing fluid, whereby flushing fluid is sucked into said print head.

8. A method according to claim 6, in which said step (iii) of conveying comprises continuing to apply said suction pressure to said ink feed line and continuing to connect said ink feed line to a source of flushing fluid, whereby flushing fluid is sucked into said print head.

9. A method according to claim 1, in which the flushing fluid is used during operation of the ink jet printer as an diluent.

10. A method according to claim 1, in which said ink jet printer comprises a gutter and a suction source, and in normal operation of the printer at least some ink is directed into said gutter and suction pressure from said suction source is applied to said gutter, and in said step (ii) of applying suction pressure, suction pressure from said suction source is applied to said ink feed line.

11. An ink jet printer comprising an ink feed line having first and second ends, a pressurised ink supply system coupled for at least some of the time to said first end of said ink feed line, and a print head coupled to said second end of said ink feed line, said printer further comprising a suction pressure source couplable to one of said first and second ends of said ink feed line, a source of flushing fluid couplable to the other of said first and second ends of said ink feed line, and a control means operable to couple said suction pressure source to said one of said first and second ends and said source of flushing fluid to said other of said first and second ends at least during a first period.

12. A printer according to claim 11, in which said pressurised ink supply system is coupled to said first end of said ink supply line during a second period subsequent to said first period.

13. A printer according to claim 11, in which said suction pressure source is coupled to said ink feed line during said first period via said print head.

14. A printer according to claim 11 further comprising a gutter, said suction pressure source being coupled to said gutter at least during a period other than said first period.

15. An ink jet printer comprising a valve, means to supply ink under pressure to said valve, a print head, an ink feed line to convey ink from said valve to said print head for forming an ink jet, means to supply flushing fluid to said ink feed line, means to apply suction pressure to said ink feed line and control means to control said flushing fluid supply means and said suction pressure applying means to supply flushing fluid and apply suction pressure to said ink feed line during a common period so as to draw flushing fluid into said ink feed line, whereby ink under pressure from said ink supply means may subsequently be applied to said ink feed line through said valve to drive flushing fluid, which has been drawn into said ink feed line, through a part of said print head.

16. A printer according to claim 15, in which the flushing fluid is drawn into said ink feed line through said valve.

17. A printer according to claim 16, comprising a further valve between said first said valve and a supply of flushing fluid and operable to isolate the first said valve from said supply of flushing fluid.

18. A printer according to claim 15 comprising a gutter, and suction means to apply suction pressure to said gutter, said suction means also providing suction pressure to said means for applying suction pressure to said ink feed line.

* * * * *